US008384832B2

(12) United States Patent
Fairgrieve et al.

(10) Patent No.: US 8,384,832 B2
(45) Date of Patent: Feb. 26, 2013

(54) SYSTEMS AND METHODS FOR PARTITIONED COLOR, DOUBLE RATE VIDEO TRANSFER

(75) Inventors: Alexander Fairgrieve, Sunnyvale, CA (US); D. Stuart Smith, Milpitas, CA (US)

(73) Assignee: Intersil Americas Inc., Milpitas, CA (US)

( * ) Notice: Subject to any disclaimer, the term of this patent is extended or adjusted under 35 U.S.C. 154(b) by 323 days.

(21) Appl. No.: 12/844,691

(22) Filed: Jul. 27, 2010

(65) Prior Publication Data

US 2011/0157485 A1 Jun. 30, 2011

Related U.S. Application Data (60) Provisional application No. 61/290,861, filed on Dec. 29, 2009.

(51) Int. Cl.
*H04N 9/28* (2006.01)
(52) U.S. Cl. ..................................................... 348/744
(58) Field of Classification Search .................. 348/744, 348/746, 760, 552, 553; 341/144, 118, 137; 372/38.07, 38.01; 345/592, 102, 81; 369/59.11, 369/47.52
See application file for complete search history.

(56) References Cited

U.S. PATENT DOCUMENTS

| 5,638,183 | A | * | 6/1997 | Hayashi et al. | 358/300 |
| 7,057,990 | B1 | * | 6/2006 | Seo | 369/47.52 |
| 7,460,458 | B2 | * | 12/2008 | Seo | 369/59.11 |
| 7,474,286 | B2 | * | 1/2009 | Hajjar et al. | 345/81 |
| 7,496,121 | B2 | * | 2/2009 | Ishida et al. | 372/38.02 |
| 7,511,771 | B2 | * | 3/2009 | Stern et al. | 348/744 |
| 7,573,922 | B2 | * | 8/2009 | Kamatani et al. | 372/38.01 |
| 7,693,196 | B2 | * | 4/2010 | Kamatani et al. | 372/38.01 |
| 7,711,018 | B2 | * | 5/2010 | Champion et al. | 372/29.011 |
| 7,822,086 | B2 | * | 10/2010 | Brown et al. | 372/38.02 |
| 7,830,936 | B2 | * | 11/2010 | Robinson et al. | 372/38.07 |
| 7,889,107 | B2 | * | 2/2011 | Lee | 341/137 |
| 7,952,507 | B2 | * | 5/2011 | Katsis et al. | 341/144 |
| 8,232,957 | B2 | * | 7/2012 | Hajjar et al. | 345/102 |
| 2009/0323741 | A1 | | 12/2009 | Deladurantaye et al. | |

OTHER PUBLICATIONS

MAX3600, "Laser Driver for Projectors," Abridged Data Sheet, Maxim Integrated Products, 19-4720; Rev. 1, Oct. 2009.
THS8200, "All-Format Oversampled Component Video/PC Graphics D/A System with Three 11-Bit DAC's, CGMS Data Insertion," Data Manua, Texas Instruments, SLES032B, Apr. 2009.

(Continued)

*Primary Examiner* — Paulos M Natnael
(74) *Attorney, Agent, or Firm* — Vierra Magen Marcus & DeNiro LLP (57) ABSTRACT

Systems, methods and devices provide for fast and power efficient transfer of three color data words (e.g., a M-bit red color word, a M bit green color word and a M-bit blue color word) per pixel from a controller to a laser diode driver (LDD). First and second transfer words are produced based on the three color data words. The first transfer word is transferred from the controller to the LDD and stored at LDD in response to a low-to-high portion of a cycle of a data transfer clock, and the second transfer word is transferred and stored in response to a high-to-low portion of a cycle of the data transfer clock. The first, second and third color data words are reproduced by the LDD in dependence on the first and second received transfer words. First, second and third DACs of the LDD are driven with the first color data word, the second color data word, and the third color data word. Three light sources (e.g., red, green and blue laser diodes or LEDs) are driven with output currents of the DACs.

25 Claims, 8 Drawing Sheets

OTHER PUBLICATIONS

THS8136, "Triple 10-Bit 180 MSPS Graphics and Video DAC," Texas Instruments, SLES236, Nov. 2008.
Happich, J. "Triple RGB laser Driver Enables Designers to Embed Pico Projectors," Power Management Design Line, Oct. 23, 2009.
"Double Data Rate," Wikipedia, http://en.wikipedia.org/wiki/Double_data_rate, accessed Mar. 8, 2010.
"DDR SDRAM," Wikipedia, http://en.wikipedia.org/wiki/DDR_SDRAM, accessed Mar. 8, 2010.
"DDR2 SDRAM," Wikipedia, http://en.wikipedia.org/wiki/DDR2_SDRAM, accessed Mar. 8, 2010.
"DDR3 SDRAM," Wikipedia, http://en.wikipedia.org/wiki/DDR3_SDRAM, accessed Mar. 8, 2010.

* cited by examiner

SYSTEMS AND METHODS FOR PARTITIONED COLOR, DOUBLE RATE VIDEO TRANSFER

PRIORITY CLAIM

This application claims priority under 35 U.S.C. 119(e) to U.S. Provisional Patent Application No. 61/290,861, filed Dec. 29, 2009, entitled SYSTEMS AND METHODS FOR PARTITIONED COLOR, DOUBLE RATE VIDEO TRANSFER, which is incorporated herein by reference.

BACKGROUND

Figure 1:
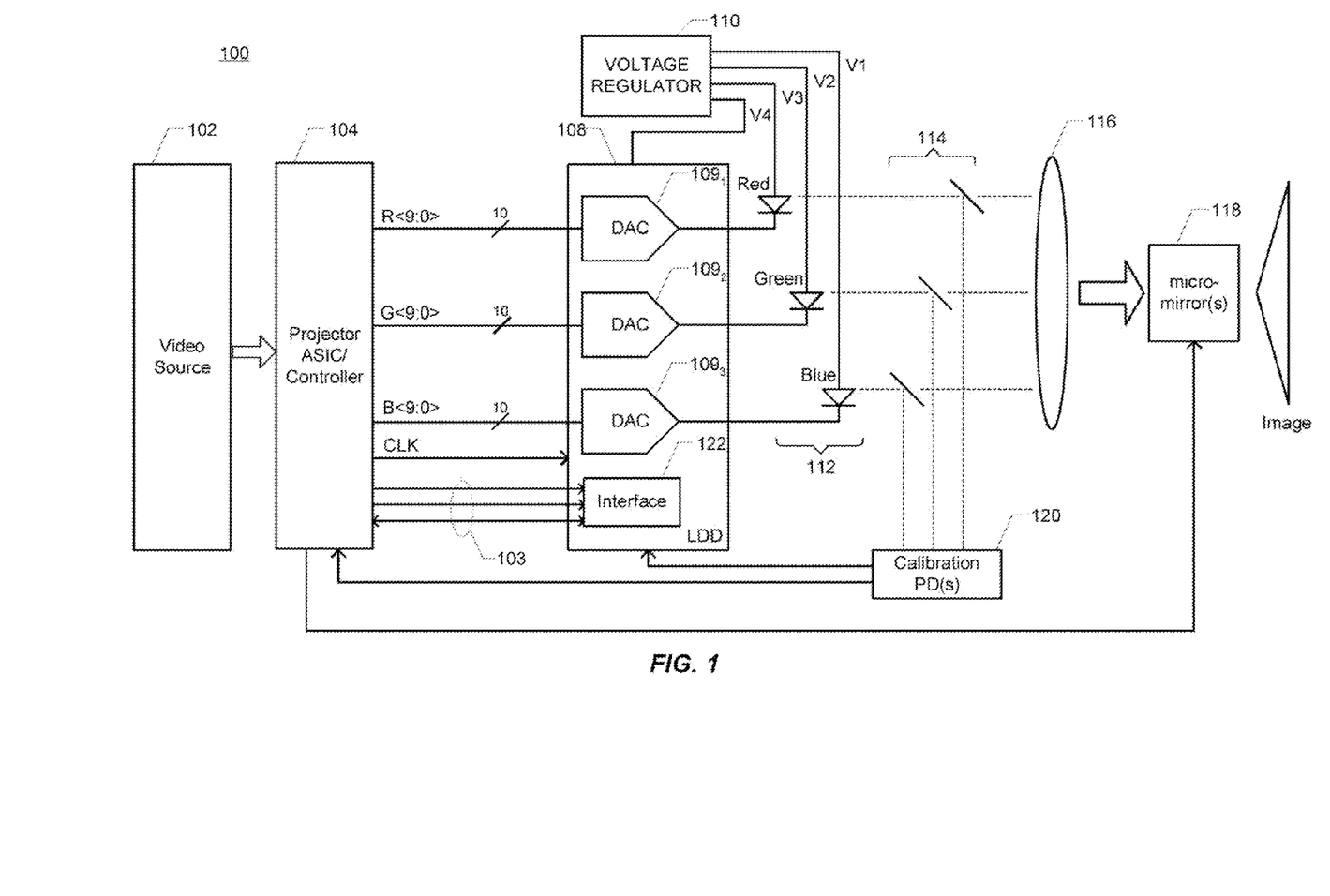
FIG. 1 is a high level block diagram of an exemplary miniature projector display device, sometimes referred to as a picoprojector.

FIG. 1 illustrates an exemplary miniature projector display device 100, sometimes referred to as a picoprojector. The miniature projector device 100 can be integrated with or attached to a portable device, such as, but not limited to, a mobile phone, a smart phone, a portable computer (e.g., a laptop or netbook), a personal data assistant (PDA), or a portable media player (e.g., DVD player). The miniature projector device 100 can alternatively be integrated with or attached to a non-portable device, such as a desktop computer or a media player (e.g., a DVD player), but not limited thereto. The miniature projector device 100 can also be used in television applications, digital picture frame applications, as well as other applications.

Referring to FIG. 1, the projector display device 100 is shown as including a video source 102, a controller 104 (e.g., an application specific integrated circuit and/or a micro-controller), a laser diode driver (LDD) 108 and a voltage regulator 110. Depending on the type of video source, a video analog-font-end (AFE) (not shown) can be included between the video source 102 and the controller 104, and the video AFE may include, e.g., one or more analog-to-digital converters (ADCs). However, a video AFE may not be needed where the video source is a digital video source. The controller 106 can perform scaling and/or pre-distortion of video signals before such signals are provided to the LDD 108. The voltage regulator 110 (e.g., a quad-output adjustable DC-DC buck-boost regulator) can convert a voltage provided by a voltage source (e.g., a battery or AC supply) into the various voltage levels (e.g., four voltage levels V1, V2, V3 and V4) for powering the various components of the projector display device 100.

The LDD 108 is shown as including three digital-to-analog converters DACs $109_1$, $109_2$ and $109_3$ (which can be collectively referred to as DACs 109). The LDD is also shown as including a serial interface 122 which may receive, via a serial bus 103, a serial enable (SEN) signal and a serial clock signal (SClk) from a serial interface of the controller 104. Additionally, a bi-directional serial data input/output (SDIO) line of the serial bus 103 allows the controller 104 to write data to and read data from registers within the LDD 108. Alternative serial buses and interfaces can be used, such as, but not limited to, an Inter-Integrated Circuit (I2C) or a Serial Peripheral Interface (SPI) bus and interface. The LDD 108 also includes registers, and the like, which are not shown.

The DACs 109 of the LDD 108 drive laser diodes 112, which can include, e.g., a red, a green and a blue laser diode, but are not limited thereto. Where the LDD 108 is used to drive a red (R), a green (G) and a blue (B) laser diode, the LDD can be referred to as a RGB triple laser diode driver. The use of alternative light emitting elements, such as light emitting diodes (LEDs), etc., is also possible. Accordingly, as the term is used herein, a laser diode driver (LDD), unless stated otherwise, can drive light emitting elements including, but not limited to, laser diodes (e.g., the LDD may alternatively drive LEDs).

The light produced by the laser diodes 112 or other light emitting elements can be provided to beam splitters 114, which can direct a small percentage of the light toward one or more calibration photo-detectors (PDs) 120, and direct the remainder of the light toward projector optics 116, which include lenses, mirrors, reflection plates and/or the like. The light output by the optics 116 can be provided to one or more micro mirror(s) 118. The mirror(s) 118 can be controlled by the controller 106, or another portion of the system, to raster-scan reflected light onto a surface, e.g., a screen, a wall, the back of a chair, etc.

Video data typically contains three primary colors, red (R), green (G) and blue (B)—which in a digital system are sent as three color data words of some length, e.g., 10-bits each in the case of certain miniature projectors. All three color data words have to be transferred from the controller 104 to the LDD 108 for each pixel. This can cause the data and clock rates and/or or the number of parallel connections (e.g., signal traces) to be relatively high. For example, where the R, G and B data words are 10 bits each, 30 parallel signal traces can be used just transfer the R, G and B data words from the controller 104 to the LDD 108. Alternatively, the 10 bit R, G and B data words can be sent one after the other from the controller 104 to the LDD 108 over the same 10 parallel signal traces, but this could require a data and clock rate that is 3 times as fast.

SUMMARY

Certain embodiments of the present invention generally relate to systems, methods and devices that provide for fast and power efficient transfer of three color data words (e.g., a M-bit red word, a M bit green word and a M-bit blue word) per pixel from a controller to a laser diode driver (LDD). A first transfer word, e.g., a (3*M)/2 bit word, is transferred from the controller to the LDD and stored at LDD in response to a low-to-high portion of a cycle of a data transfer clock, and a second transfer word, e.g., a (3*M)/2 bit word, is transferred and stored in response to a high-to-low portion of a cycle of the data transfer clock, where, e.g., M=10, and (3*M)/2=15. The first, second and third color data words are reproduced by the LDD in dependence on the first and second received transfer words. First, second and third DACs of the LDD are driven with the first color data word, the second color data word, and the third color data word. Three light sources (e.g., red, green and blue laser diodes or LEDs) are driven with output currents of the DACs.

In accordance with an embodiment, transferring and storing the first transfer word in response to the low-to-high portion of a cycle of the data transfer clock signal includes transferring and storing all bits of the first color data word, and some bits of the second color data word. In this embodiment, transferring and storing the second transfer word in response to the high-to-low portion of a cycle of the data transfer clock signal includes transferring and storing all bits of the third color data word, and the remaining bits of the second color data word.

In accordance with an alternative embodiment, transferring and storing the first transfer word in response to the low-to-high portion of a cycle of the data transfer clock signal includes transferring and storing some bits of the first color data word, some bits of the second color data word, and some bits of the third color data word. In this embodiment, transferring and storing the second transfer word in response to the high-to-low portion of a cycle of the data transfer clock signal includes transferring and storing the remaining bits of the first color data word, the remaining bits of the second color data word, and the remaining bits of the third color data word.

Embodiments of the present invention are also directed to laser diode drivers (LDDs) including interface circuitry configured to receive a data transfer clock signal, receive and store a first transfer word in response to a low-to-high portion of a cycle of the data transfer clock signal, and receive and store a second transfer word in response to a high-to-low portion of a cycle of the data transfer clock signal. Additionally, the interface circuitry is configured to produce a first color data word, a second color data word and a third color data word in dependence on the first and second stored transfer words, wherein the first, second and third color data words are used to drive three DACs.

In accordance an embodiment, one of the first and second transfer words stored by the interface circuitry during a cycle of the data transfer clock signal includes all bits of the first color data word, and some bits of the second color data word. In this embodiment, the other one of the transfer words stored by the interface circuitry during a cycle of the data transfer clock signal includes all bits of the third color data word, and the remaining bits of the second color data word.

In accordance with another embodiment, one of the first and second transfer words stored by the interface circuitry during a cycle of the data transfer clock signal includes some bits of the first color data word, some bits of the second color data word, and some bits of the third color data word. In this embodiment, the other one of the transfer words stored by the interface circuitry during a cycle of the data transfer clock signal includes the remaining bits of the first color data word, the remaining bits of the second color data word, and the remaining bits of the third color data word.

In accordance with an embodiment, the interface circuitry includes input data latches, multiplexers and output data latches. The input data latches are configured to latch and thereby store the first transfer word in response to the low-to-high portion of a cycle of the data transfer clock signal, and latch and thereby store the second transfer word in response to the high-to-low portion of a cycle of the data transfer clock signal. The multiplexers are configured to produce the first color data word, the second color data word and the third color data word in dependence on the first and second received transfer words. The output data latches are configured to latch the first color data word, the second color data word and the third color data word from the multiplexers. Additionally, the output data latches are configured to drive a first DAC with the first color data word, drive a second DAC with the second color data word, and drive a third DAC with the third color data word.

Embodiments of the present invention are also directed to systems that include, among other items, a controller and a laser diode driver (LDD). In accordance with an embodiment, the controller is configured to accept an input video signal that includes first color data, second color data, third color data per pixel. Additionally, the controller is configured to produce a first transfer word and a second transfer word in dependence on the first color data, the second color data, and the third color data per pixel. Further, the controller is configured to transmit the first transfer word and the second transfer word to a laser diode driver (LDD) over a same multi-bit wide bus during one cycle of a data transfer clock signal. In accordance with an embodiment, the LDD of the system is configured to receive the data transfer clock signal, receive and store the first transfer word in response to a low-to-high portion of a cycle of the data transfer clock signal, and receive and store the second transfer word in response to a high-to-low portion of a cycle of the data transfer clock signal. Additionally, the LDD is configured to produce the first color data word, the second color data word and the third color data word in dependence on the first and second received transfer words. Further, the LDD is configured to drive a first DAC of the LDD with the first color data word, drive a second DAC of the LDD with the second color data word, and drive a third DAC of the LDD with third color data word. Such systems can also include a red light emitting element, a green light emitting element and a blue light emitting element, wherein each of the red, green and blue light emitting elements is driven by a current output of a different one of the first, second and third DACs. In some embodiment, each of the red, green and blue light emitting elements comprises a three separate laser diodes. In other embodiments, each of the red, green and blue light emitting elements comprises a three separate light emitting diodes. In some embodiments, the light emitting elements can include elements that produce alternative and/or additional colors.

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

As mentioned above, the miniature projector device 100 can be integrated with a portable device, such as, a mobile phone. Due to the small size of such a portable device, it is desirable to reduce the number of connections between the controller 104 and the LDD 108 to reduce the size and pin count of both such chips. Further, to reduce the cost of such chips, and the power consumed by such chips, it is desirable to keep the data and clock speeds down. For a specific example, the challenge may be to get 3×10 bit words of video data from the controller chip 104 to the LDD chip 108 every 10 ns. If a 100 MHz clock is used, then 30 parallel data pins may be required to support the data flow. This necessitates a high pin count for applications, such as miniature projectors, where a small footprint chip is required to allow the unit to fit into a small space. If however the data is transferred as three 10 bit words sequentially in color order, then the clock rate has to go up to 300 MHz, which is too high for many application chips.

In accordance with embodiments of the present invention described below, there is a compromise between data transfer rate and number of connections. Further, in accordance with embodiments of the present invention described below, the data transfer clock speed is kept down by using both edges of the data transfer clock.

In accordance with specific embodiments of the present invention, RGB video data is transferred as two words, rather than as three words. For example, where the RGB video data is 30 bits per pixel (10 bits per R, G and B color), rather than transferring three separate 10 bit words between the controller 104 and the LDD 108 per pixel, two 15 bits words are transferred. Splitting all three words of the color data into two fractions allows the use of one clock. Further, the two fractions are easily identified without any further synchronization signals.

Figure 2A:
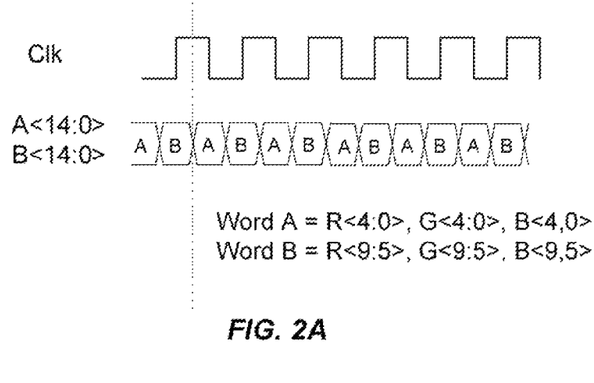
FIG. 2A is an exemplary timing diagram used to explain embodiments of the present invention that split up each of three color data words into two halves, transfer half of all three color data words in response to the low-to-high portion (e.g., on the rising edge) of a clock, and transfer the remaining half of all three color data words in response to the high-to-low portion (e.g., on the falling edge) of the clock.

In specific embodiments, this can be accomplished by splitting up each of the three color data words into two halves (which can be referred to as two nibbles) and transferring half of all three color data words in response to the low-to-high portion (e.g., on the rising edge) of the clock, and the remaining half in response to the high-to-low portion (e.g., on the falling edge) of the clock. For example, assuming that each color data word is 10 bits, then each of the R, G and B data words can be split up into their 5 most significant bits (MSBs) and their 5 least significant bits (LSBs). The 5 MSBs of the R, G and B data word can be combined (e.g., concatenated) to form a first 15 bit word (which can be referred to as the A-word or the first transfer word); and the 5 LSBs of the R, G and B data word can be combined (e.g., concatenated) to form a second 15 bit word (which can be referred to as the B-word or the second transfer word). The A-word can be transferred in response to the low-to-high portion of the clock, and the B-word can be transferred in response to the high-to-low portion of the clock, or vice-versa. An exemplary timing diagram for transferring the first and second transfer words is shown in FIG. 2A. Other combining techniques besides concatenation are possible, and are within the scope of the present invention.

Figure 2B:
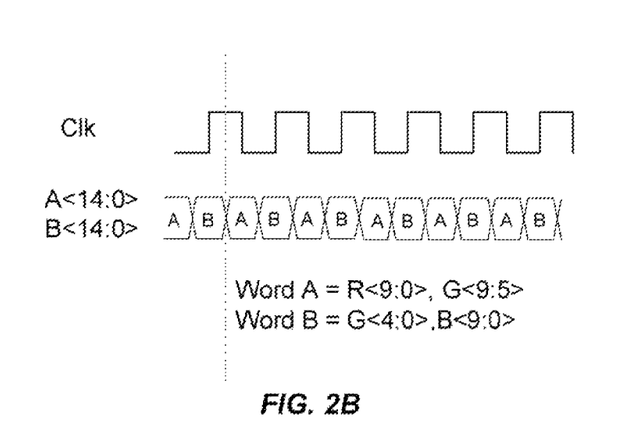
FIG. 2B is an exemplary timing diagram used to explain other embodiments of the present invention split one of three color data words in half, and send half of that color data word with another complete color data word in response to the low-to-high portion (e.g., on the rising edge) of a clock, and the other half of that color data word is with the third complete color data word in response to the high-to-low portion (e.g., on the falling edge) of the clock.

In other embodiments, one of the color data words (e.g., the G data word) is split in half, and half of that color data word is sent with another complete color data word, and the other half of that color data word is sent with the third complete color data word. For example, assuming again that each color data word is 10 bits, the G data word can be split into its 5 most significant bits (MSBs) and its 5 least significant bits (LSBs). The 5 MSBs of the G data word can be combined (e.g., concatenated) with the 10 bits of the R data word to form a first 15 bit word; and the 5 LSBs of the G data word can be combined with the 10 bits of the B data word to form a second 15 bit word. The first 15 bit word (which can be referred to as the A-word or the first transfer word) can be transferred in response to the low-to-high portion of the clock, and the second 15 bit word (which can be referred to as the B-word or the second transfer word) can be transferred in response to the high-to-low portion of the clock, or vice-versa. An exemplary timing diagram for this is shown in FIG. 2B. In alternative embodiments, instead of splitting the G data word into two halves, the R or B data words can be slit into two halves. Other techniques for producing two 15 bit transfer words based on three 10 bit color data words are possible, and within the scope of the present invention. More generally, other techniques for producing two transfer words based on three or more color data words are possible, and within the scope of the present invention.

It is also within the scope of the present invention that each color data word can include more, or less, than 10 bits. Further, it is also within the scope of the present invention that the different color data words can have different numbers of bits, e.g., the R data word is 9 bits, the G data word is 10 bits and the B data word is 11 bits. For this example, two 15 bit transfer words can still be produced based on the three color data words using techniques similar to those just described above. Additionally, the first and second transfer words need not be exactly the same number of bits. For example, if the total number of bits of the different color data words is an odd number, than one of the transfer words may be 1 bit larger or smaller than the other transfer word. Nevertheless, for the sake of explanation, and to continue with the exemplary embodiments described with reference to FIGS. 2A and 2B, for much of the remainder of this description it will be assumed that there are three color data words each being 10 bits, and that each of the first and second transfer words is 15 bits.

Figure 3:
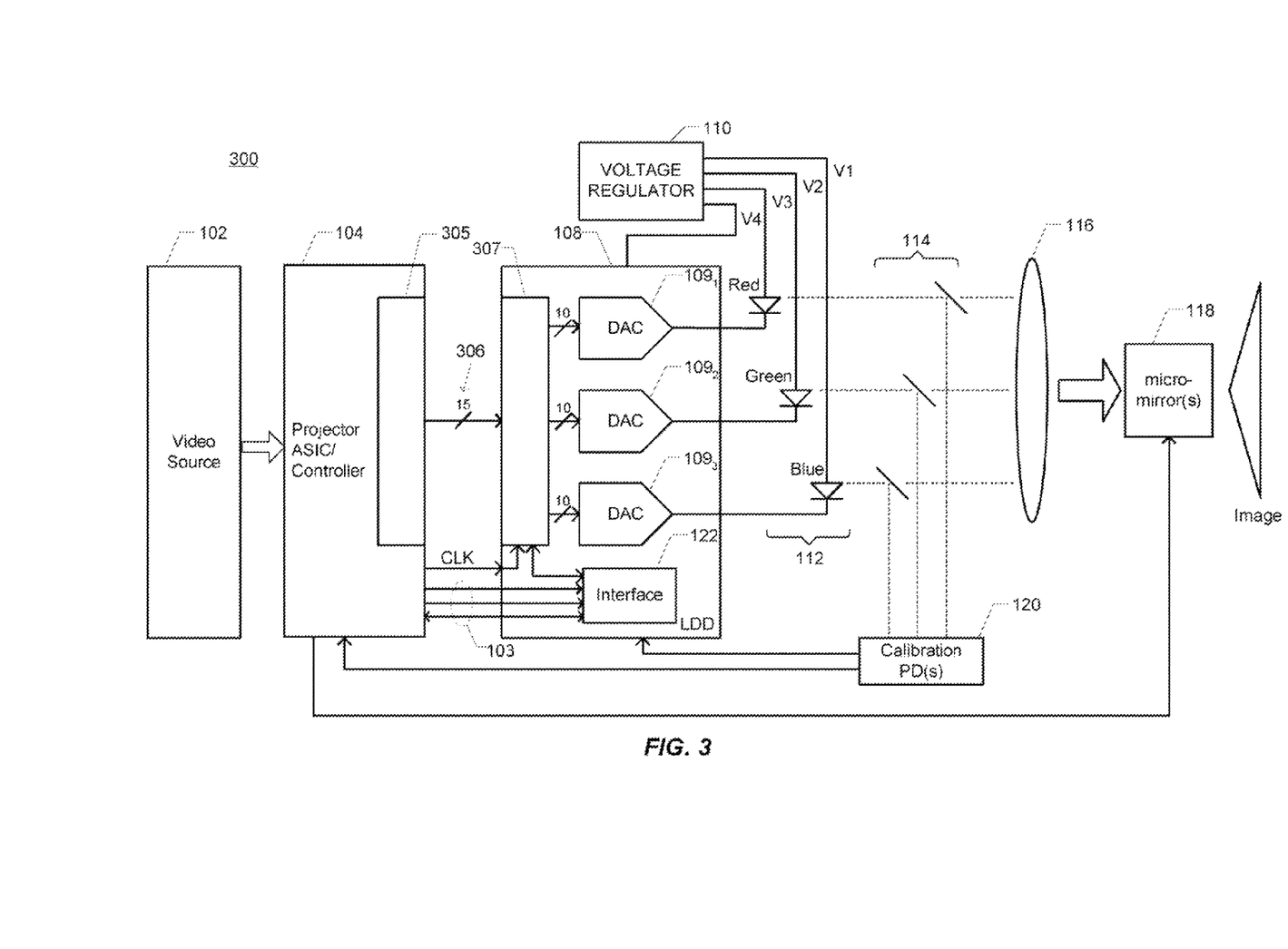
FIG. 3 illustrates an exemplary miniature projector display device that has been modified to implement specific embodiments of the present invention.

FIG. 3 illustrates an exemplary miniature projector display device 300, that has been modified to implement specific embodiments of the present invention. As can be appreciated from FIG. 3, output interface circuitry 305 has been added to the controller 104, and input interface circuitry 307 has been added to the LDD 108. As can also be appreciated from FIG. 3, a 15 bit wide bus 306 (e.g., 15 parallel signal traces) is used to transfer 15 bits in parallel from the output interface circuitry 305 of the controller 104, to the input interface circuitry 307 of the LDD 108.

In accordance with specific embodiments, the output interface circuitry 305 encodes the 10 bit R data word, 10 bit G data word and 10 bit B data word into two 15 bit data words to be sent during a single clock cycle (one 15 bit word is sent in response to the low-to-high portion of the clock, and the second 15 bit word is sent in response to the high-to-low portion of the clock). Exemplary schemes for doing this were mentioned above, and are also discussed below. The output interface circuitry 305 can include latches, multiplexers and/or other encoding circuitry to perform the encoding of the three 10 bit data words into two 15 bit data words.

Figures 4A, 4B:
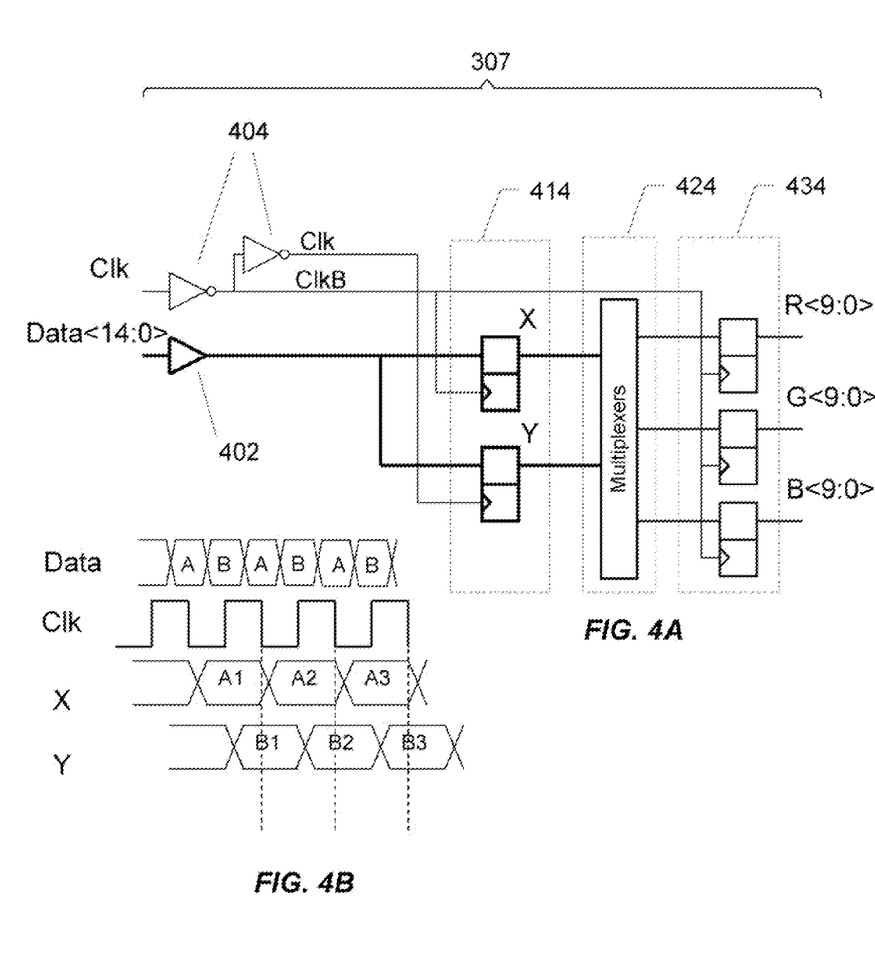
FIG. 4A illustrates input interface circuitry of a LDD, according to an embodiment of the present invention, where the interface circuitry decodes two 15 bit words it receives during a clock cycle into three separate 10 bit words, each of which are used to drive a separate DAC.
FIG. 4B is an exemplary timing diagram that is useful for explaining the interface circuitry of FIG. 4A.

In accordance with specific embodiments, the input interface circuitry 307 of the LDD 108 decodes the two 15 bit words it receives during a clock cycle into three separate 10 bit words, including a 10 bit R data word, a 10 bit G data word and a 10 bit B data word, and uses each of the three 10 bit color data words to drive the appropriate DAC 109. To accomplish this, the input interface circuitry 207 can include, e.g., latches, multiplexers and/or other decoder circuitry. For example, referring to FIG. 4A, the input interface circuitry 307 can include a first group of latches 414, multiplexers 424 and a second group of latches 434. Also shown in FIG. 4A are input buffers 404 for the clock signal, and input buffers 402 for the 15 bit data signal. The clock buffers 404 (shown as being implemented by inverters) provide both a clock signal (Clk) and inverted clock signal (ClkB) so data can be captured on both edges of the clock signal. Preferably, propagation to both rising and falling edges of output data are well matched to active edges of both clock signals. The data buffers 402 can, if necessary, provide a level shifting function to convert the logic levels from those of the controller 104 to those used in the LDD 108. Note, in the circuit of FIG. 4A the data lines (e.g., parallel signal traces) into the multiplexers 424 are 15 bits wide, whilst at the output of the multiplexers 424 each of the three data buses are 10 bits wide (e.g., three data buses each including 10 parallel signal traces).

The multiplexers 424 allow the interface circuitry 307 of the LDD 108 to be configured to perform more than one type of decoding of two 15 bit data words, thereby enabling the LDD to operate with various different controllers that use various types of encoding of three 10-bit words into two 15 bit data words (e.g., the encoding schemes of FIGS. 2A and 2B). In such embodiments, one or more pin of the LDD 108 can accept an input that specifies which decoding scheme the LDD should perform. Alternatively, a register of the LDD that is programmed via the serial interface of the LDD is used to specify which decoding scheme the LDD should perform. If the interface circuitry 307 of the LDD 108 is configured to perform only one type of decoding of two 15 bit data words, the decoding circuitry need not include the multiplexers 424 and lines between the input data latches 414 and the output data latches 434 can be appropriately hard wired.

If the sending controller chip 104 is powered by a lower voltage than the LDD 108, then to reduce power consumption, in accordance with an embodiment of the present invention, the 15 parallel bits of high speed color word data is transmitted at the supply voltage of the sending controller chip 104. This reduces the power lost in charging the interconnection capacitance. Thus, an implementation will take the supply voltage from the controller chip 104 to power the input level shifter buffers 402 of the interface circuitry 307 of the LDD 108. For example, the 15-bit data lines 306 and the Clk line may be driven at 1.8V levels, since many high speed controllers run at such relatively low voltages these days. The LDD 108 will receive this low voltage data in spite of the fact that the LDD 108 may run at 3.3V. This can be accomplished by including an additional supply pin (e.g., a VSL pin) for the low voltage—so that the circuitry inside the interface circuitry 307 of the LDD 108 "knows" where the logic thresholds are for the data and clock inputs.

Referring to FIG. 4A, the first group of latches 414 (also referred to as data capture latches or data input latches) can latch one 15 bit word in response to the low-to-high portion (e.g., on a rising edge) of the clock, and latch the second 15 bit word in response to the high-to-low portion (e.g., on a falling edge) of the clock. This can be accomplished, e.g., by latching the first word (also referred to as the A-word) in one or more data capture latches 414 (e.g., latch X in FIG. 4A) in response to the falling edge of the clock, and latching the second word (also referred to as the B-word) in one or more data capture latches 414 (e.g., latch Y in FIG. 4A) in response to the rising edge of the clock, as can be appreciated from FIG. 4B. Thereafter, by the next falling edge of clock, the data stored in the latches 414 will be decoded into the three 10 bit color data words that will be ready to be stored in the data output latches 434 and used for driving the DACs 109 of the LDD 108.

Figure 4C:
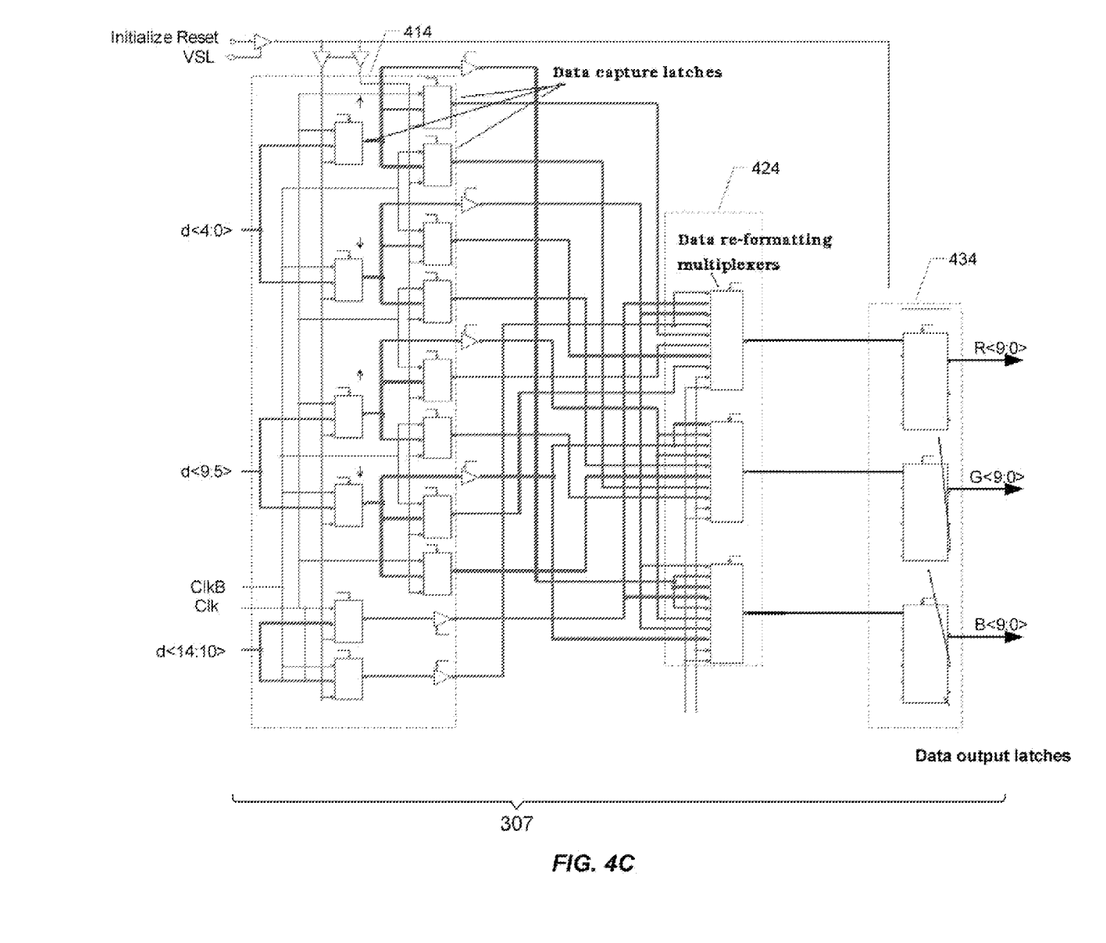
FIG. 4C shows exemplary addition details of the interface circuitry of FIG. 4A, in accordance with an embodiment.

FIG. 4C shows exemplary addition details of the circuitry of FIG. 4A, following the data and clock buffers 402 and 404, in accordance with an exemplary embodiment.

Figure 5A:
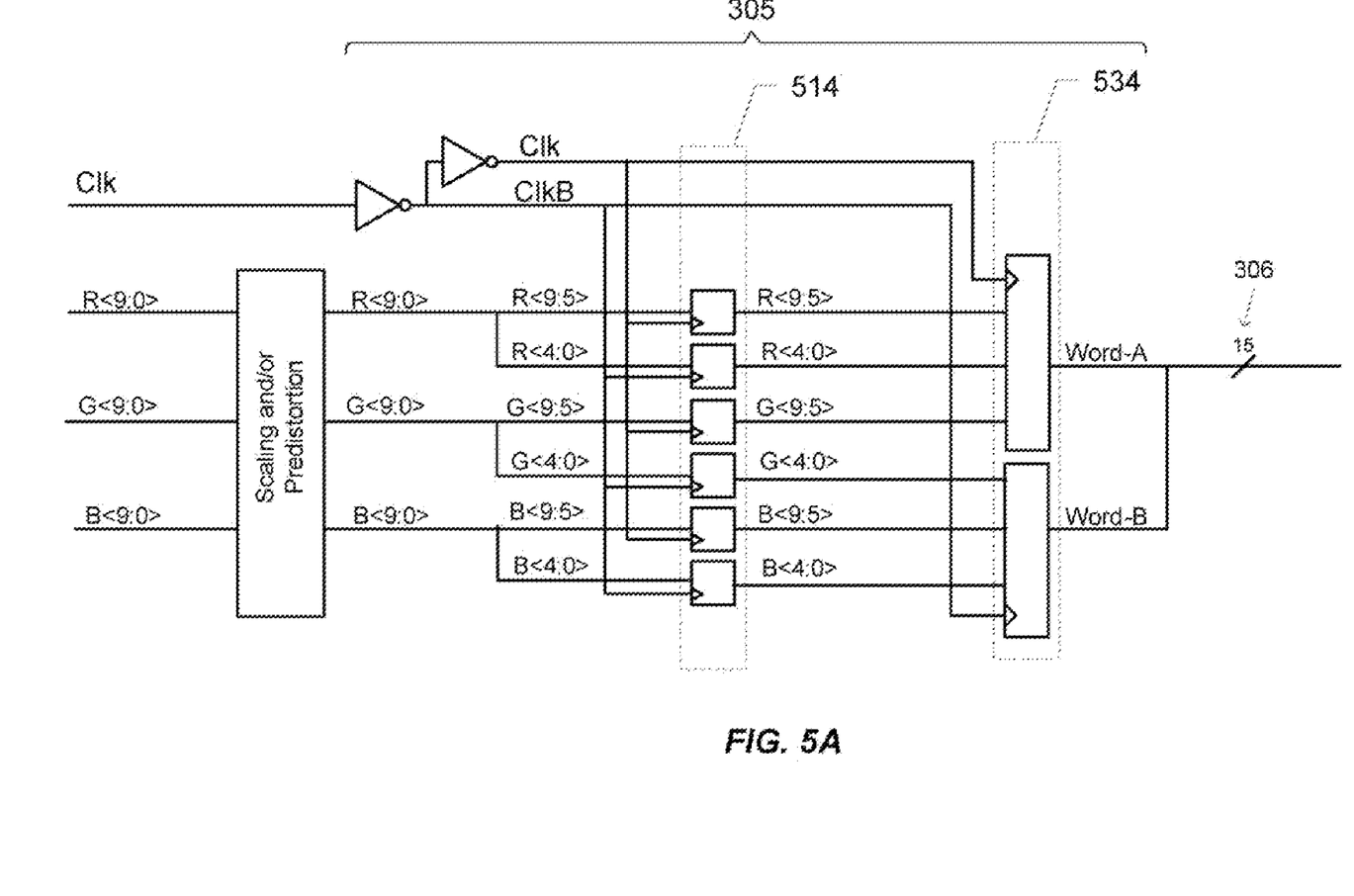
FIG. 5A illustrates output interface circuitry of a controller, according to an embodiment of the present invention, that can be used to implement the encoding scheme introduced in FIG. 2A.
Figure 5B:
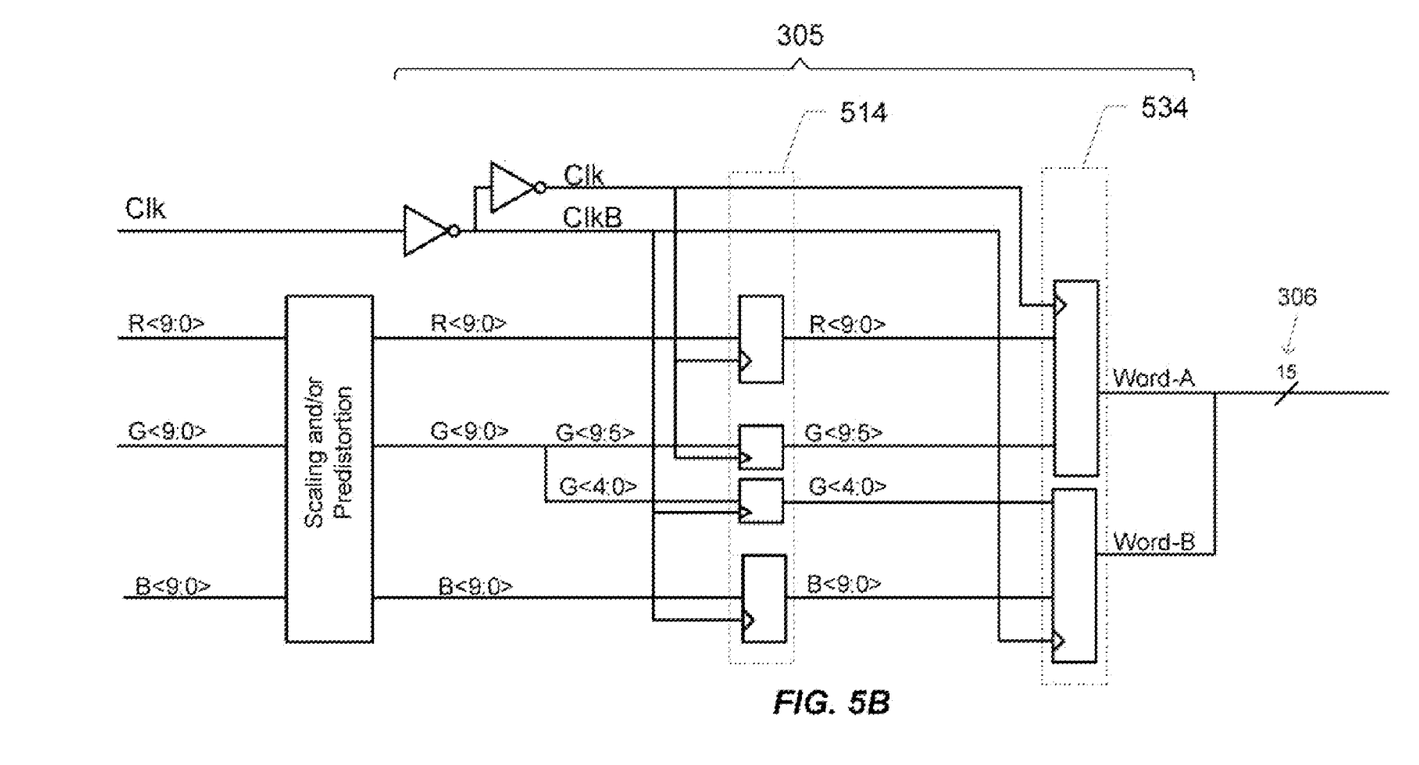
FIG. 5B illustrates exemplary output interface circuitry of the controller, according to another embodiment of the present invention, that can be used to implement the encoding scheme introduced in FIG. 2B.

FIG. 5A illustrates exemplary output interface circuitry 305 of the controller 104 that can be used to implement the encoding scheme introduced in FIG. 2A, where the 5 MSBs of the R, G and B data word are combined (e.g., concatenated) to form the first 15 bit word (which can be referred to as the A-word); and the 5 LSBs of the R, G and B data word are combined (e.g., concatenated) to form the second 15 bit word (which can be referred to as the B-word). FIG. 5B illustrates exemplary output interface circuitry 305 of the controller 104 that can be used to implement the encoding scheme introduced in FIG. 2B, where the 5 MSBs of the G data word are combined (e.g., concatenated) with the 10 bits of the R data word to form the first 15 bit word (which can be referred to as the A-word); and the 5 LSBs of the G data word are combined with the 10 bits of the B data word to form a second 15 bit word (which can be referred to as the B-word). In each embodiment, the A-word can be transferred in response to the low-to-high portion of the clock (by latching the appropriate bits into the upper output latch), and the B-word can be transferred in response to the high-to-low portion of the clock cycle (by latching the appropriate bits into the lower output latch), or vice versa.

In FIGS. 5A and 5B, there are input latches 514 and output latches 534 that are selectively enabled and specifically configured to perform the desired encoding. Some of the latches are enabled by the Clk signal, while other latches are enabled by the inverted clock signal ClkB. Assuming for example that each latch is configured to be enabled when the enable signal provided to the latch transitions from low-to-high, then some latches can be enabled in response to a low-to-high portion of the Clk signal, while other latches can be enabled in response to a high-to-low portion of the Clk signal by providing the inverted Clk signal (i.e., ClkB) to the enable inputs of such other latches. If it is desired that the output interface circuitry 305 of the controller 104 can perform more than one type of encoding (e.g., the types of both FIGS. 2A and 2B), then multiplexers can be added between the input latches 514 and output latches 534 to enable the switching between the types of encoding.

In the above described exemplary embodiments, each color data word was described as being 10 bits. More generally, in certain embodiments each color data word can be M bits, where M is equal to 10, less than 10, or greater than 10, and M is preferably an even integer $\geq 2$. In other embodiments, each color data words need not be the same number of bits, as mentioned above. It is also not necessary that each color data word have an even number of bits.

In the above described exemplary embodiments, three 10 bits words were described as being encoded into two 15 bit words for transfer from a controller to an LDD. More generally, in certain embodiments three M bit words can be encoded into two (3*M)/2 bit transfer words. In other embodiments, e.g., where the different color data words are not the same size and/or where the total number of bits of the different color data words is not an even number, one of the transfer words can be larger or smaller than the other transfer word.

In the above described exemplary embodiments, two 15 bits words were described as being decoded by an LDD into three 10 bit words. However, more generally, two (3*M)/2 bit transfer words can be decoded into three M bit color data words. Even more generally, two transfer words can be decoded into three (or more) color data words.

Exemplary embodiments for encoding three M bit color data words into two (3*M)/2 bit data words for transfer between a controller and an LDD were described above. However, other embodiments for encoding three M bit color data words into two (3*M)/2 bit data words for transfer between a controller and an LDD are also within the scope of the present invention. More generally, other embodiments for encoding three (or more) color data words into two transfer words for transfer between a controller and an LDD are also within the scope of the present invention.

Exemplary embodiments for decoding two (3*M)/2 bit transfer words into three M color data words were described above. However, alternative embodiment for decoding two (3*M)/2 bit transfer words into three M color data words are also within the scope of the present invention. More generally, other embodiments for decoding two transfer words into three (or more) color data words are also within the scope of the present invention.

In specific embodiments of the present invention, an LDD can be configured to perform more than one type of decoding of two transfer words, thereby enabling the LDD to operate with various different controllers that use various types of encoding of three (or more) color data words into two transfer words. In such embodiments, one or more pin of the LDD can accept an input that specifies which decoding scheme the LDD should perform. Alternatively, a register of the LDD that is programmed via the serial interface of the LDD can be used to specify which decoding scheme the LDD should perform.

Figure 6:
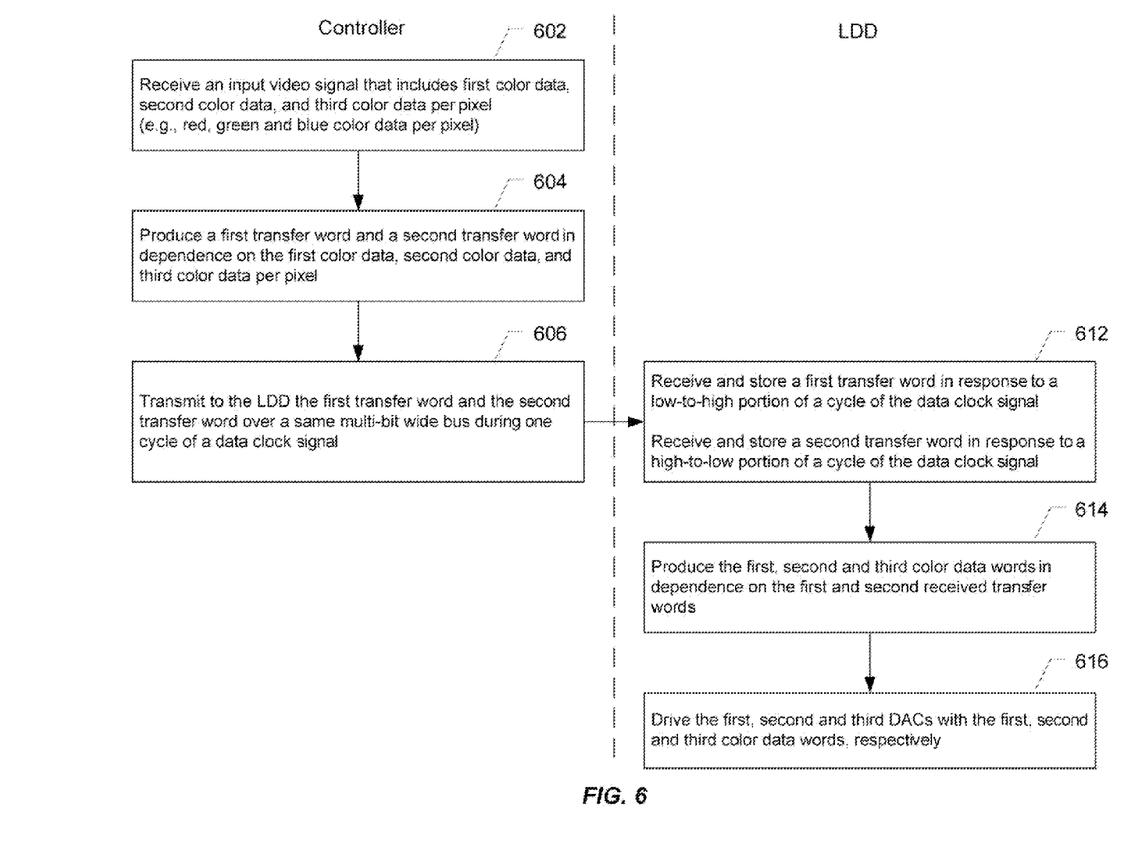
FIG. 6 is a high level flow diagram that is useful for summarizing various methods of the present invention.

FIG. 6 is a high level flow diagram that is useful for summarizing various methods of the present invention. Steps 602, 604 and 606 can be performed by a controller (e.g., 104), and more specifically by output interface circuitry (e.g., 305) of a controller. Steps 612, 614 and 616 can be performed by a LDD (e.g., 108), and more specifically by input interface circuitry (e.g., 307) of the LDD. Additional details of each of the steps shown in FIG. 6 can be appreciated from the above discussion.

While the light emitting elements described herein were described as being red, green and blue in color, it is within the scope of the present invention that the light emitting elements emit light of colors other than red, green and blue, such as, but not limited to, cyan, magenta and yellow. It is also within the scope of the present invention that more three colors are produced per pixel by the light emitting elements, e.g., red, green, blue and yellow, and that the first and second transfer words are produced based on more than three color data words (e.g., based on four color data words). Further, if there were four color data words, the LDD could include four DACs.

While specific embodiments of the present invention described above apply double data rate (DDR) techniques (where data is transferred in response to a low-to-high portion of a cycle of a clock, as well as in response to a high-to-low portion of a cycle of the clock), such embodiments of the present invention are much more than a direct application of DDR techniques. For example, in order to transfer three M bit words across an M bit wide bus using conventional DDR techniques, one and one-half clock cycles would be necessary. For a more specific example, if convention DDR techniques where used to transfer a 10 bit R data word, a 10 bit G data word and a 10 bit B data word across a 10 bit wide bus, one and one-half clock cycles would be needed. By contrast, using the embodiments of the present invention described above, the 30 bits or RGB data can be transferred as two (3*M)/2 bit transfer words across a (3*M)/2 bit wide bus during a single clock cycle. For example, using embodiments of the present invention described above, which provide a compromise between data rate and number of connections, a 10 bit R data word, a 10 bit G data word and a 10 bit B data word can be transferred across a 15 bit wide bus during a single clock cycle.

The foregoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art.

Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A laser diode driver (LDD), comprising:
a first digital-to-analog converted (DAC) configured to receive a first color data word and produce, in dependence on the first color data word, a first output current to drive a light source of a first color;
a second DAC configured to receive a second color data word and produce, in dependence on the second color data word, a second output current to drive a light source of a second color;
a third DAC configured to receive a third color data word and produce, in dependence on the third color data word, a third output current to drive a light source of a third color; and
interface circuitry configured to
receive a data transfer clock signal, wherein each cycle of the data transfer clock signal includes a low-to-high portion and a high-to-low portion;
receive and store a first transfer word in response to the low-to-high portion of a cycle of the data transfer clock signal;
receive and store a second transfer word in response to the high-to-low portion of a cycle of the data transfer clock signal;
produce the first color data word, the second color data word and the third color data word in dependence on the first and second stored transfer words; and
drive the first DAC with the first color data word;
drive the second DAC with second color data word; and
drive the third DAC with the third color data.

2. The LDD of claim 1, wherein:
the first color data word comprises a first M-bit word;
the second color data word comprises a second M-bit word;
the third color data word comprises a third M-bit word;
the first transfer word comprises a first (3*M)/2 bit word; and
the second transfer word comprises a second (3*M)/2 bit word.

3. The LDD of claim 2, wherein:
M=10; and
(3*M)/2=15.

4. The LDD of claim 1, wherein:
the first color is red;
the second color is blue; and
the third color is green.

5. The LDD of claim 1, wherein:
one of the first and second transfer words stored by the interface circuitry during a cycle of the data transfer clock signal includes
all bits of the first color data word, and
some bits of the second color data word; and
the other one of the first and second transfer words stored by the interface circuitry during a cycle of the data transfer clock signal includes
all bits of the third color data word, and
the remaining bits of the second color data word.

6. The LDD of claim 1, wherein:
one of the first and second transfer words stored by the interface circuitry during a cycle of the data transfer clock signal includes
some bits of the first color data word,
some bits of the second color data word, and
some bits of the third color data word; and
the other one of the first and second transfer words stored by the interface circuitry during a cycle of the data transfer clock signal includes
the remaining bits of the first color data word,
the remaining bits of the second color data word, and
the remaining bits of the third color data word.

7. The LDD of claim 1, wherein the interface circuitry includes:
input data latches configured to
latch and thereby store the first transfer word in response to the low-to-high portion of a cycle of the data transfer clock signal; and
latch and thereby store the second transfer word in response to the high-to-low portion of a cycle of the data transfer clock signal;
multiplexers configured to produce the first color data word, the second color data word and the third color data word in dependence on the first and second received transfer words; and
output data latches configured to
latch the first color data word, the second color data word and the third color data word from the multiplexers;
drive the first DAC with the first color data word;
drive the second DAC with the second color data word; and
drive the third DAC with the third color data word.

8. A method for use with a laser diode driver (LDD), that includes
a first digital-to-analog converted (DAC) configured to receive a first color data word and produce, in dependence on the first color data word, a first output current to drive a light source of a first color,
a second DAC configured to receive a second color data word and produce, in dependence on the second color data word, a second output current to drive a light source of a second color, and
a third DAC configured to receive a third color data word and produce, in dependence on the third color data word, a third output current to drive a light source of a third color,
the method comprising:
receiving a data transfer clock signal, wherein each cycle of the data transfer clock signal includes a low-to-high portion and a high-to-low portion;
receiving and storing a first transfer word in response to the low-to-high portion of a cycle of the data transfer clock signal;
receiving and storing a second transfer word in response to the high-to-low portion of a cycle of the data transfer clock signal;
producing the first color data word, the second color data word and the third color data word in dependence on the first and second received transfer words;
driving the first DAC with the first color data word;
driving the second DAC with the second color data word; and
driving the third DAC with the third color data word.

9. The method of claim 8, wherein:
the first color data word comprises a first M-bit word;
the second color data word comprises a second M-bit word;
the third color data word comprises a third M-bit word;
the first transfer word comprises a first (3*M)/2 bit word; and
the second transfer word comprises a second (3*M)/2 bit word.

10. The method of claim 9, wherein:
M=10; and
(3*M)/2=15.

11. The method of claim 8, wherein:
the first color is red;
the second color is blue; and
the third color is green.

12. The method of claim 8, wherein:
the step of receiving and storing the first transfer word in response to the low-to-high portion of a cycle of the data transfer clock signal includes receiving and storing
all bits of the first color data word, and
some bits of the second color data word; and
the step of receiving and storing the second transfer word in response to the high-to-low portion of a cycle of the data transfer clock signal includes receiving and storing
all bits of the third color data word, and
the remaining bits of the second color data word.

13. The method of claim 8, wherein:
the step of receiving and storing the first transfer word in response to the low-to-high portion of a cycle of the data transfer clock signal includes receiving and storing
some bits of the first color data word,
some bits of the second color data word, and
some bits of the third color data word; and
the step of receiving and storing the second transfer word in response to the high-to-low portion of a cycle of the data transfer clock signal includes receiving and storing
the remaining bits of the first color data word,
the remaining bits of the second color data word, and
the remaining bits of the third color data word.

14. The method of claim 8, further comprising:
driving a light source of the first color with the first output current produced by the first DAC;
driving a light source of the second color with the second output current produced by the second DAC; and
driving a light source of the third color with the third output current produced by the third DAC.

15. A system, comprising:
a controller configured
accept an input video signal that includes first color data, second color data, and third color data per pixel;
produce a first transfer word and a second transfer word in dependence on the first color data, the second color data, and the third color data per pixel;
transmit the first transfer word to a laser diode driver (LDD) over a multi-bit wide bus during a first portion of one cycle of a data transfer clock signal; and transmit the second transfer word to the LDD over the same multi-bit wide bus during a second portion of the same one cycle of the data transfer clock.

16. The system of claim 15, wherein
the first color data, the second color data, and the third color data per pixel comprises M-bits of first color data, M-bits of second color data, and M-bits of third color data per pixel; and
the first transfer word comprises a first (3*M)/2 bit word;
the second transfer word comprises a second (3*M)/2 bit word; and
the controller is configured to transmit the first and second (3*M)/2 bit words to the LDD over the same (3*M)/2 bit wide bus during one cycle of the data transfer clock signal.

17. The system of claim 15, wherein the controller includes latches configured to produce the first transfer word and the second transfer word in dependence on the first color data, the second color data, and the third color data per pixel.

18. The system of claim 15, wherein the controller is also configured to perform at least one of scaling and pre-distortion of the input video signal such that color data within the first transfer word and the second transfer word has already been scaled and/or pre-distorted.

19. A system, comprising:
a controller configured to
accept an input video signal that includes first color data, second color data, and third color data per pixel;
produce a first transfer word and a second transfer word in dependence on the first color data, the second color data, and the third color data per pixel; and
transmit the first transfer word and the second transfer word to a laser diode driver (LDD) over a same multi-bit wide bus during one cycle of a data transfer clock signal; and
a laser diode driver (LDD) configured to
receive the data transfer clock signal, wherein each cycle of the data transfer clock signal includes a low-to-high portion and a high-to-low portion;
receive and store the first transfer word in response to the low-to-high portion of a cycle of the data transfer clock signal;
receive and store the second transfer word in response to the high-to-low portion of a cycle of the data transfer clock signal;
produce the first color data, the second color data and the third color data in dependence on the first and second received transfer words; and
drive a first DAC of the LDD with the first color data;
drive a second DAC of the LDD with the second color data; and
drive a third DAC of the LDD with third color data.

20. The system of claim 19, further comprising:
a red light emitting element;
a green light emitting element; and
a blue light emitting element;
wherein each of the red, green and blue light emitting elements is driven by a current output of a different one of the first, second and third DACs.

21. The system of claim 20, wherein each of the red, green and blue light emitting elements comprises a three separate laser diodes or three separate light emitting diodes.

22. A method, comprising:
accepting an input video signal that includes first color data, second color data, and third color data per pixel;
producing a first transfer word and a second transfer word in dependence on the first color data, the second color data, and the third color data per pixel;
transmitting the first transfer word to a laser diode driver (LDD) over a multi-bit wide bus during a first portion of one cycle of a data transfer clock signal; and
transmitting the second transfer word to the LDD over the same multi-bit wide bus during a second portion of the same one cycle of the data transfer clock.

23. A method, comprising:
accepting an input video signal that includes first color data, second color data, and third color data per pixel;
producing a first transfer word and a second transfer word in dependence on the first color data, the second color data, and the third color data per pixel; and
transmitting the first transfer word and the second transfer word to a laser diode driver (LDD) over a same multi-bit wide bus during one cycle of a data transfer clock signal;
wherein the first color data, the second color data, and the third color data per pixel comprise, respectively, M-bits of first color data, M-bits of second color data, and M-bits of third color data per pixel; and
wherein the first transfer word comprises a first (3*M)/2 bit word;
wherein the second transfer word comprises a second (3*M)/2 bit word; and
wherein the transmitting comprises transmitting the first and second (3*M)/2 bit words to the LDD over the same (3*M)/2 bit wide bus during one cycle of the data transfer clock signal.

24. The system of claim 15, wherein:
one of the first and second transfer words includes
all bits of the first color data word, and
some bits of the second color data word; and
the other one of the first and second transfer words includes
all bits of the third color data word, and
the remaining bits of the second color data word.

25. The system of claim 15, wherein:
one of the first and second transfer words includes
some bits of the first color data word,
some bits of the second color data word, and
some bits of the third color data word; and
the other one of the first and second transfer words includes
the remaining bits of the first color data word,
the remaining bits of the second color data word, and
the remaining bits of the third color data word.

* * * * *